US 6,691,724 B2

(12) United States Patent
Ford

(10) Patent No.: US 6,691,724 B2
(45) Date of Patent: Feb. 17, 2004

(54) METHOD AND SYSTEM FOR CONTROLLING A HOUSEHOLD WATER SUPPLY

(76) Inventor: Michael Brent Ford, 2716 Rio Vista, St. George, UT (US) 84790

( * ) Notice: Subject to any disclaimer, the term of this patent is extended or adjusted under 35 U.S.C. 154(b) by 3 days.

(21) Appl. No.: 10/122,880

(22) Filed: Apr. 11, 2002

(65) Prior Publication Data

US 2003/0192600 A1 Oct. 16, 2003

(51) Int. Cl.[7] .............................................. E03B 1/04
(52) U.S. Cl. .................... 137/1; 137/624.11; 137/39; 137/59; 251/129.04; 4/623
(58) Field of Search ................ 137/624.11, 624.12, 137/59, 39, 78.1, 1; 251/129.04; 4/623

(56) References Cited

U.S. PATENT DOCUMENTS

| | | | | |
|---|---|---|---|---|
| 4,730,637 A | * | 3/1988 | White ................. 137/624.2 X |
| 5,086,526 A | * | 2/1992 | Van Marcke ...... 251/129.04 X |
| 5,588,636 A | * | 12/1996 | Eichholz et al. ....... 251/129.04 |
| 5,960,807 A | * | 10/1999 | Reyman ................... 137/39 X |

* cited by examiner

*Primary Examiner*—Kevin Lee
(74) *Attorney, Agent, or Firm*—A. Mitchell Harris; Jeffrey Weiss; Weiss, Moy & Harris, P.C.

(57) ABSTRACT

A method and system for controlling a household water supply provides protection of structures and fixtures from water damage due to plumbing failure or other causes. The household water supply is shut-off in conformity with a determination that the household is unoccupied and thereby provides automatic protection from water damage.

20 Claims, 5 Drawing Sheets

US 6,691,724 B2

METHOD AND SYSTEM FOR CONTROLLING A HOUSEHOLD WATER SUPPLY

CROSS REFERENCE TO RELATED APPLICATIONS

The present application is related to U.S. patent application Ser. No. 10/122,877 entitled "POSITIVE FLOW METER" filed concurrently with this application and also to U.S. patent application Ser. No. 10/122,878 entitled "DISTRIBUTED RESIDENTAL ALARM SYSTEM AND METHOD THEREFOR" also filed concurrently with this application.

BACKGROUND OF THE INVENTION

1. Field of the Invention

The present invention relates generally to water control systems, and more specifically, to a system for controlling a household water supply.

2. Background of the Invention

Water supplies connected to a household are typically controlled only at the points of service, e.g., sink faucets, shower valves and appliances that connect to the water supply provide individual shut-off for water flow. The household water supply connection is typically controlled by a manual external valve that can be used to shut-off water flow in the event of an emergency water leak or for servicing the water supply system plumbing or replacing appliances.

Flooding due to plumbing failures is a major source of damage to structures and fixtures such as carpeting, wood flooring, wallboard, etc. The most frequent water supply emergency events are failure due to freezing temperatures inside the water supply plumbing and failure of the water heater tank. A freezing condition usually occurs when the house is unoccupied, for example, a vacation home that is unoccupied during winter is at risk for damage due to bursting of water supply lines due to freezing. Other water supply emergency events may occur when the house is unoccupied, such as failure of a polyvinyl chloride (PVC) plumbing joint, or water heater tank wall erosion and leakage.

Since water pressure needs to be available while persons are present in the household, the supply pressure must be available when the household is occupied. Also, certain automatic water users such as icemakers, dishwashers and washing machines make automatic demands on the water supply that may occur when the household is unoccupied. It is also inconvenient to manually control a household water supply upon entering or exiting a household.

Systems have been implemented that shut off the household water supply in response to detection of leaks using detectors located near water heaters, sinks, etc. But, these systems only protect against leaks where water reaches the detectors and could require a large number of detectors for adequate coverage. Other systems have been developed that measure water flow and shut off the water supply if excessive flow occurs based on whether or not the house is occupied as programmed manually by a switch. The flow type systems typically use flow meters that are incapable of detecting water flows below a certain threshold, such as a dripping faucet.

Therefore, it would be desirable to provide a method and system for controlling a household water supply to prevent flooding. It would further be desirable to control a household water supply in a manner that automatic water users are able to obtain water, while preventing leaks that occur while the water supply is not being used.

SUMMARY OF THE INVENTION

The above objective of preventing flooding due to plumbing failure is achieved in a method and system that automatically control a household water supply. The system includes an electrically controllable valve, a motion sensor and a control system for controlling the automatic valve in conformity with a motion detector output.

The foregoing and other objectives, features, and advantages of the invention will be apparent from the following, more particular, description of the preferred embodiment of the invention, as illustrated in the accompanying drawings.

DETAILED DESCRIPTION OF THE PREFERRED EMBODIMENTS

Figure 1:
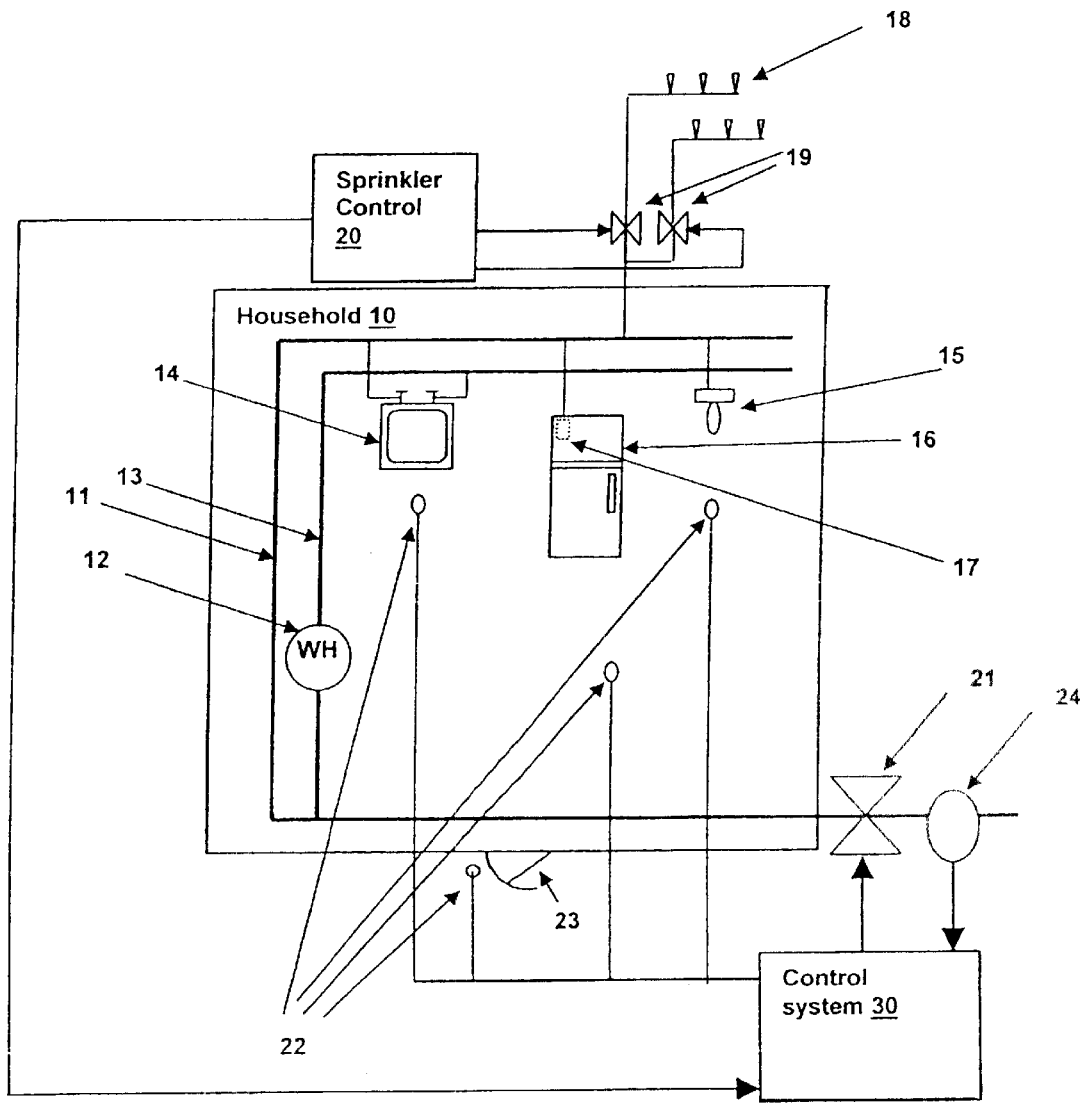
FIG. 1 is a schematic diagram depicting a household water supply coupled to a system in accordance with an embodiment of the present invention.

Referring now to the figures and in particular to FIG. 1, a household water supply coupled to a system in accordance with an embodiment of the present invention is shown. Within household 10, a cold water supply line 11 routes the water supply to various fixtures such as sinks 14, a refrigerator 16 containing an ice maker 17 toilets 15, and so forth. A water heater 12 is also coupled to cold water supply line 11, to supply a hot water supply line 13, which is routed to sinks 14 and other fixtures in household 10. Cold water supply line 11 is also coupled to lawn sprinklers 18 by electrically controlled sprinkler valves 19 that are activated and deactivated by an electric sprinkler control 20 system.

Water pressure for the entire household 10 water supply system is provided by a water supply main coupling controlled by electrically controllable valve 21. A control system 30 in accordance with an embodiment of the present invention is electrically coupled to electrically controlled valve 21, to shut off the water supply to household 10 in the presence of a detected abnormal flow condition. Flow of water into household 10 is detected by flow meter 24 which is generally a positive flow meter as described in co-pending U.S. Patent Application entitled: "POSITIVE FLOW METER", filed concurrently herewith and the specification of which is incorporated herein by reference. Use of a valve in accordance with the embodiment described in the above-referenced patent application permits the detection of very small flow rates associated with small leaks. As the present invention detects a leak in accordance with starting and stopping of water flow, a valve that can measure a very small continuous flow is exceptionally useful in embodiments of the present invention.

Within household 10, are located motion sensors 22, providing an indication of occupancy of household, and consequently, whether flow through flow meter 24 is normal use by an occupant of household 10. A motion sensor 22 may also be located near an entrance 23 in addition to or in alternative to locating motion sensors 22 throughout household 10. If motion sensors 22 are located adjacent to every used entrance 23 of household 23, occupancy may be determined, but generally not activity of occupants. If motion sensors 22 are located throughout household 10, the system of the present invention may control water flow in accordance with activity of occupants. Specific embodiments of the present invention may locate motion sensors near zones of use, such as near a shower or bathtub, so that larger flows produced by these fixtures may be correlated with the activity of an occupant.

Control system 30 derives information from motion sensors 22 and flow meter 24 in order to control the household 10 water supply via electrically controllable valve 21. Information from other sensors for detecting abnormal conditions may also be provided to control system 30 as well as manual controls and operating controls. Sprinkler control 20 is electrically coupled to control system 30 to provide a signal of normal sprinkler usage.

Figure 2:
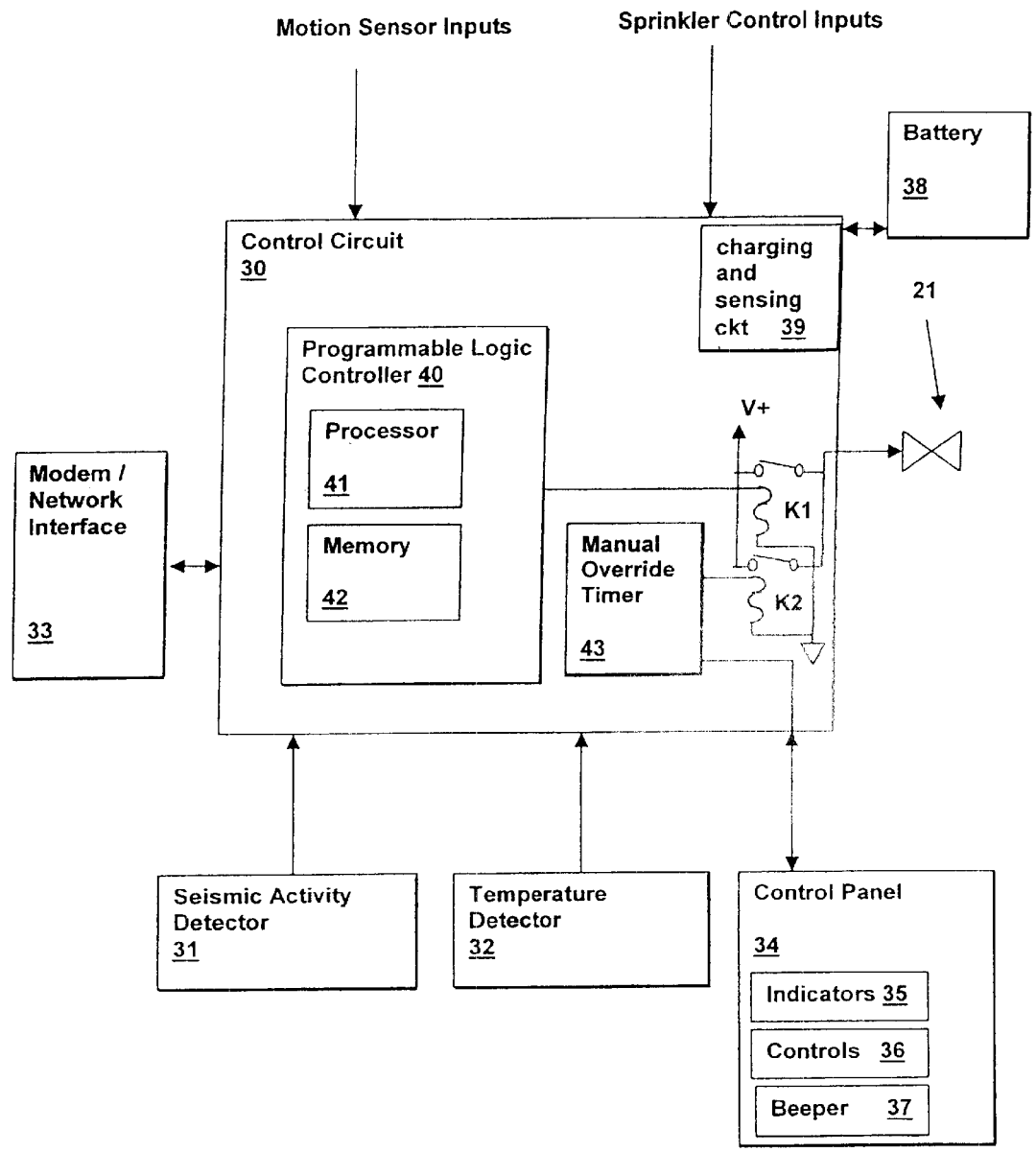
FIG. 2 is a block diagram depicting a system in accordance with an embodiment of the present invention.

Referring now to FIG. 2, details of control circuit 30 and its interconnections are depicted. Control circuit 30 receives motion sensor inputs and sprinkler control inputs, as well as an input from a seismic activity detector 31, a temperature detector 32 and a control panel 34. Temperature detector 32 is used to predict potentially freezing conditions within cold water supply line 11 and electrically controllable valve 21 may be shut off in conformity with detecting the potentially freezing condition. Likewise, seismic activity detector 31 provides an indication of earthquake activity, and electrically controllable valve 21 may be shut off in conformity with detecting an earthquake. Temperature detector 32 and seismic activity detector 31 may be switches activated upon detection of the associated event, or they may be sensors and the detection circuitry may be provided within control circuit 30.

Control panel 34 provides for manual control of control circuit (and thus the system of the present invention) via controls 36 and provides an indication of operational state via visual indicators 35 and a beeper 37 for providing an audible alarm. Remote control and indication of state may be provided by a modem/network interface 33 which may be coupled to a telephone network or other suitable network connection such as Digital Subscriber Link (DSL), cable modem or a router connection deriving therefrom. Control operations may be performed within control circuit 30 in response to codes received by modem/network interface 33 and system status may be provided by control circuit 30 to a remote location via modem/network interface 33.

Within control circuit 30, control is provided by program code executed from memory 42 by a processor 41. Memory 42 and processor 41 are provided by a programmable logic controller 40, although other forms of processing system such as single board computers, may be used to implement control algorithms in accordance with the present invention and dedicated circuits may also be used. A particular advantage of programmable logic controller 40 is that remote control modules such as X10 controllers are commercially available to couple control circuit 30 to various sensors, e.g. packaged motion sensors are available with X10 connections that transmit signals via household 10 power lines, making it unnecessary to directly wire motion sensors to control circuit 30. Additionally, controls are available so that electrically controllable valve could be operated by an X10 controller. However, particular advantages associated with a manual override within the present invention might make remote control of electrically controllable valve 21 undesirable.

Programmable logic controller 40 controls electrically controllable valve 21 via relay K1. A manual override timer 43 provides a timeout when a system user operates a manual "on" control from control panel 34. Relay K2 is activated when the manual "on" control is pressed, turning on electrically controllable valve 21 until the timeout occurs (generally one hour). The system uses a battery 38 to supply operating power for control circuit 30, but the manual override may be used in event of failure of portions of the system or loss of the programmable logic controller 40 control program. Loss of household 10 primary power may also affect portions of the system, depending on implementation, so manual override timer 43 may also be useful during a power failure. A battery charging and sensing circuit 39 connects to battery 38 from control circuit 30. Battery 38 is maintained in a charged state by charging and sensing circuit 39, and automatic operation of the system may be held off while battery 38 has insufficient charge to properly operate the system.

Since battery power should be conserved by the system, electrically controllable valve 21 is preferably a pulse type valve (latching solenoid valve). Therefore, programmable logic lab controller 40 or manual override timer 43 activate electrically controllable valve 21 using a pulse (generally on the order of 0.5 second) to either turn on or turn off electrically controllable valve. Special circuits within control circuit 30 may be used to produce the pulses, or programmable logic controller 40 may be programmed to produce the desired pulse. Manual override timer 43 will generally comprise a one-shot pulse generator that generates a pulse to turn off electrically controllable valve 21 after the timeout has occurred.

Figure 3:
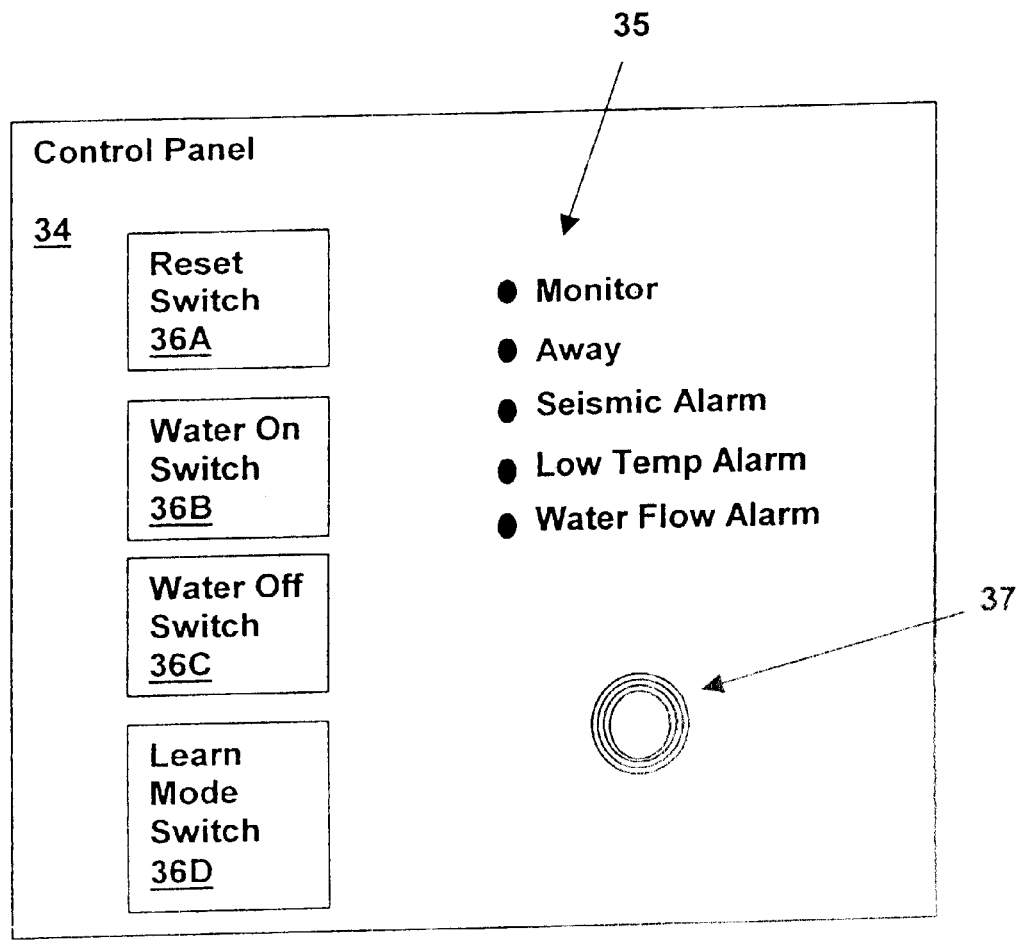
FIG. 3 is a pictorial diagram depicting control panel 34 of FIG. 2.

Referring now to FIG. 3, details of control panel 34 are depicted. Controls are provided as follows: Reset switch 36A provides a means to reset programmable logic controller 40 and other circuits within control circuit 30; water on switch 36B provides one hour of manual override water flow via manual override timer 43; water off switch turns of water flow 36C; and learn mode switch 36D activates a learn mode of operation. Indicators 35 are provided on control panel 34 and may also be located remotely. A monitor indicator notifies a user that the system is actively monitoring water flow; an away indicator indicates that lack of motion sensor activity has caused the system to enter "away" mode. A seismic alarm, low temp alarm and water flow alarm indicator are used to indicate earthquake detect, freezing detect or leak detect, respectively. A buzzer 37 is integrated within control panel 34 to provide an audible alarm, generally in accordance with a logical-OR combination of the above alarm indications.

Learn mode operation in the context of the present invention refers to the determination of water usage cycles. The present invention uses a "short" cycle and a "long" cycle to control operation of electrically controllable valve 21. A short cycle is the time period that water is permitted to flow before an alarm condition is entered. This permits appliances such as icemakers to operate. A long cycle is the time period that water is permitted to flow when motion sensors have detected activity recently within household 10, this permits an occupant to use water normally, e.g., to draw a bath, without the short cycle expiring, causing an interruption of water flow. The short and long cycles are adjustable, depending on the programmable logic controller program. Code within the programmable logic controller program measures typical water usage by occupants of the household and automated systems such as icemakers and possibly sprinklers (if a connection is not provided to override the short cycle for sprinkler operation). The typical use is turned into operational variables to control the short and long cycles, generally the long cycle will be within the range of ½ to 2 hours and the short cycle within the range of 1 to 5 minutes. The programmable logic controller program adapts the cycles when learn mode is selected and learn mode is generally self-terminated after, for example a 24 hour period.

Figure 4:
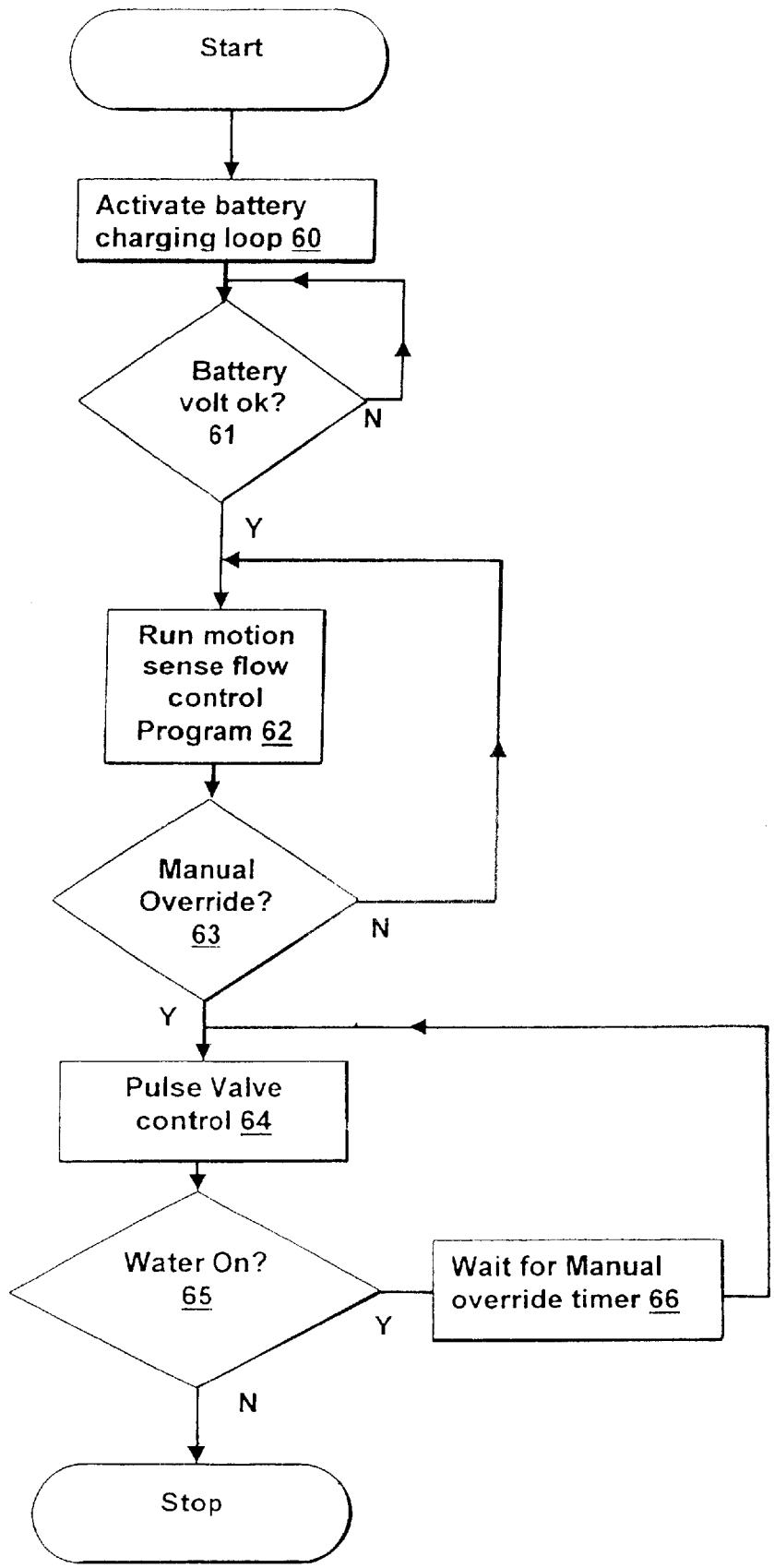
FIG. 4 is a flowchart depicting operation a system in accordance with an embodiment of the present invention.

Referring now to FIG. 4, operation of a system in At accordance with an embodiment of the present invention is depicted. First, a battery-charging loop is activated (step 60) that controls charging of battery 38, so that operation may be initiated only after battery 38 has sufficient charge to operate the system. The battery voltage is sampled and when the battery voltage is sufficient (decision 61), the motion sense flow control program is started (step 62). During operation, a manual override switch may interrupt operation (decision 63) to pulse the valve control circuit (step 64) to provide or stop water flow. If water on switch 36B was pressed (i.e. the water is on) (decision 65) then the manual override timer 66 provides the timeout that pulses valve control (step 64) to shut off the valve.

Figure 5:
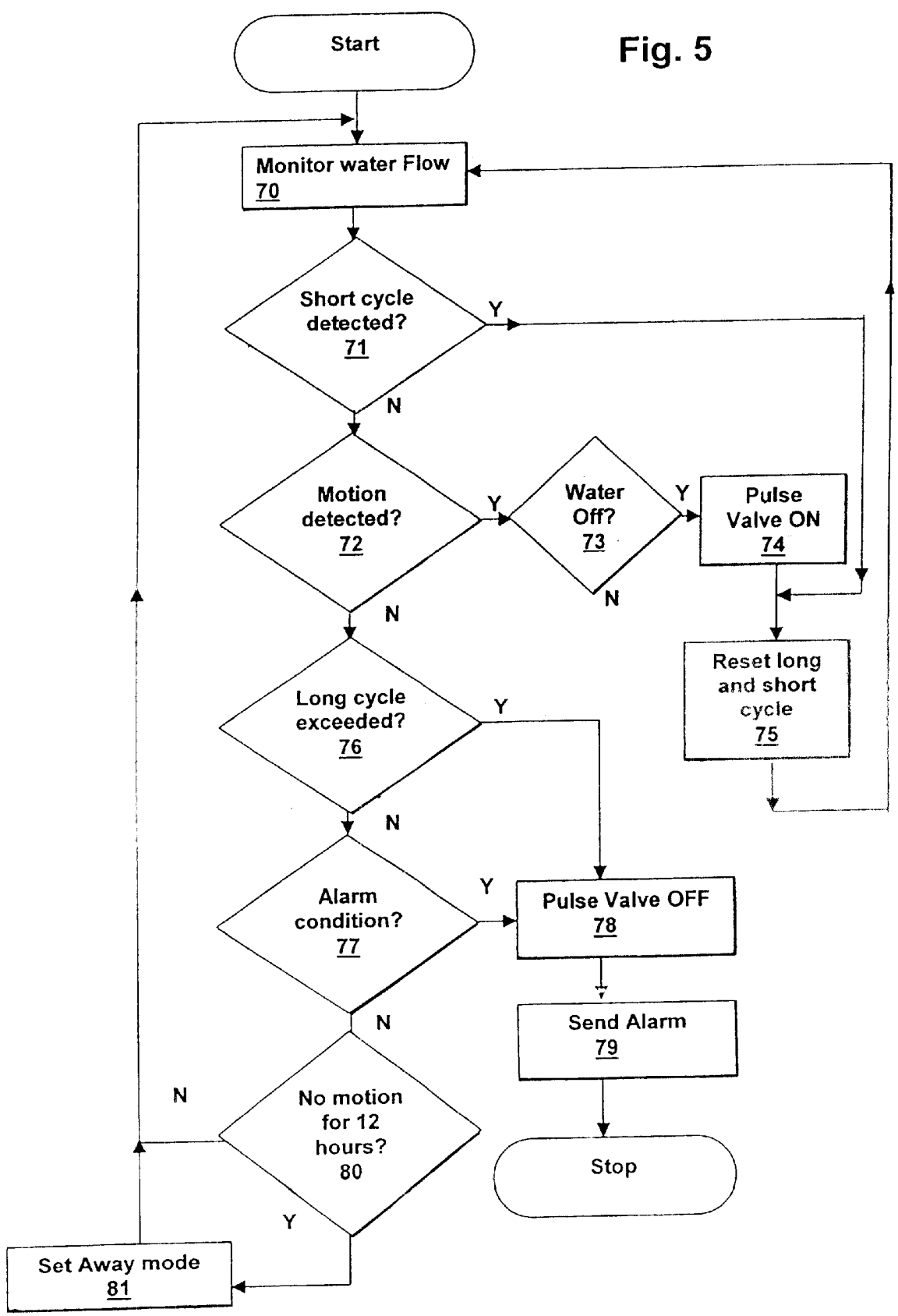
FIG. 5 is a flowchart depicting further operation of a system in accordance with an embodiment of the present invention.

Referring now to FIG. 5, further operation of a system in accordance with an embodiment of the invention is depicted. FIG. 5 illustrates the automatic operation of the motion sense flow control program activated in step 62 of FIG. 4. Water flow is monitored (step 70) and if a short cycle is detected (decision 71) corresponding to detection of a normal use of it water, the short and long cycle timers are reset (step 75). If motion is detected from a motion sensor (decision 72) and the water is currently turned off (decision 73) the water is turned on (step 74). If motion was detected in step 72, the short and long cycle timers are reset (step 75). Next, the system checks for a long cycle timeout (decision 76), if the long cycle was exceeded, the water is shut off (step 78) and an alarm indication is sent (step 79) which may be a visual indication via indicator 35, an audible alarm via buzzer 37, a remote message via modem/network interface 33, or a combination of the above. If motion is not detected for a long period (decision 80) (generally 12 hours), then away mode is activated (step 81), which essentially sets the long cycle to zero causing an alarm on any water usage.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A system for controlling a water supply of a household, comprising:
   at least one electrically controllable valve for controlling said water supply;
   a control circuit coupled to said electrically controllable valve for operating said electrically controllable valve;
   at least one motion sensor coupled to said control circuit for providing a determination of activity within said household, whereby said control circuit controls said electrically controllable valve in conformity with said determination; and
   a flow detector coupled to said control circuit for detecting a flow of said water supply, whereby said control circuit further controls said electrically controllable valve in conformity with a detected flow of said water supply.

2. The system of claim 1, further comprising a thermal detection system coupled to said control circuit for shutting off said electrically controllable valve in response to detection of a potentially freezing condition.

3. The system of claim 1, further comprising a seismographic detector coupled to said control circuit for shutting off said electrically controllable valve in response to detection of an earthquake condition.

4. The system of claim 1, wherein said control circuit further comprises:
   a long cycle timer for controlling a maximum on period of said electrically controllable valve when said motion sensor detects activity within said household; and
   a short cycle timer for controlling a maximum on period of said electrically controllable valve when said motion sensor detects no activity within said household.

5. The system of claim 4, wherein said control circuit starts said long cycle timer in response to said flow detector detecting that said flow has ceased prior to said short timer cycle expiring, whereby normal intermittent use of said water supply may be permitted when said motion detectors detect no activity within said household.

6. The system of claim 1, wherein said control circuit comprises:
   a programmable controller having a memory for storing program instructions and a processor for executing said program instructions; and
   program instructions resident within said memory for adjusting said control of said electrically controllable valve, wherein said program instructions include a learning module for detecting patterns of said detected flow.

7. The system of claim 1, wherein said flow detector is incorporated within said electrically controllable valve.

8. The system of claim 7, wherein said flow detector is a positive-pressure piston flow sensor incorporated within said electrically controllable valve.

9. The system of claim 1, wherein said control circuit further comprises an input for receiving a signal from a sprinkler control system, whereby sprinkler system use of said water supply may be permitted when said motion detectors detect no activity within said household.

10. The system of claim 1, further comprising a manual override timer circuit for providing a period of water flow wherein inputs of said motion detectors are not used to control said electrically controllable valve.

11. The system of claim 1, further comprising a timer for determining whether or not said motion sensor has detected activity for a predetermined inactivity period.

12. The system of claim 11, wherein said control circuit shuts off said water supply in response to any detected, when said predetermined inactivity period has elapsed.

13. A system for controlling a water supply of a household, comprising:
   at least one electrically controllable valve for controlling said water supply;
   a control circuit coupled to said electrically controllable valve for operating said electrically controllable valve;
   means for determining activity within said household, whereby said control circuit controls said electrically controllable valve in conformity with said determination; and
   means for detecting a flow through said electrically controllable valve, whereby said control circuit controls said electrically controllable valve further in conformity with said detected flow.

14. A method for controlling a water supply of a household, said method comprising:

detecting motion within said household;

determining whether or not said household is active in conformity with said detection;

controlling said water supply in conformity with said determination; and detecting a flow of said water supply, and wherein said controlling further controls said water supply in conformity with said detected flow.

15. The method of claim 14, further comprising:

detecting seismic activity; and wherein said water supply is further controlled in conformity with said seismic detection.

16. The method of claim 14, further comprising:

detecting an ambient temperature; and wherein said water supply is further controlled in conformity with said detected temperature.

17. The method of claim 15, further comprising incrementing a short interval timer for permitting said flow of said water supply, and wherein said controlling shuts of said water supply if said short interval timer expires.

18. The method of claim 17, further comprising resetting said short interval timer if said flow of said water supply does not exceed a predetermined short interval.

19. The method of claim 18, further comprising incrementing a long interval timer for permitting said flow of said water supply after said determination of whether or not said household is active determines that said household is active.

20. The method of claim 15, further comprising incrementing an away mode timer for setting an away mode in response to said determination of whether or not said household is active determining that said household is not active for a predetermined period, and wherein said controlling shuts off said water supply in conformity with any said detected flow when said away mode is set.

* * * * *